United States Patent
Nozawa

(10) Patent No.: US 9,873,338 B2
(45) Date of Patent: Jan. 23, 2018

(54) ELECTRIC VEHICLE

(71) Applicant: TOYOTA JIDOSHA KABUSHIKI KAISHA, Toyota-shi, Aichi-ken (JP)

(72) Inventor: Takashi Nozawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 213 days.

(21) Appl. No.: 14/949,058

(22) Filed: Nov. 23, 2015

(65) Prior Publication Data

US 2016/0144725 A1 May 26, 2016

(30) Foreign Application Priority Data

Nov. 26, 2014 (JP) ................... 2014-238705

(51) Int. Cl.
*B60L 11/18* (2006.01)
*H02M 3/335* (2006.01)

(52) U.S. Cl.
CPC ......... B60L 11/18 (2013.01); H02M 3/33584 (2013.01)

(58) Field of Classification Search
None
See application file for complete search history.

(56) References Cited

U.S. PATENT DOCUMENTS

| | | | |
|---|---|---|---|
| 9,315,105 B2* | 4/2016 | Sakamoto | B60L 1/003 |
| 2012/0123625 A1 | 5/2012 | Ueo et al. | |
| 2015/0034406 A1* | 2/2015 | Hirose | B60L 3/0046 |
| | | | 180/279 |
| 2016/0064927 A1* | 3/2016 | Smith | H02J 7/0065 |
| | | | 307/63 |
| 2016/0156258 A1* | 6/2016 | Yokoyama | H02M 1/32 |
| | | | 307/82 |

FOREIGN PATENT DOCUMENTS

| | | |
|---|---|---|
| JP | H05-336611 A | 12/1993 |
| JP | 2007-318849 A | 12/2007 |
| JP | 2008-005622 A | 1/2008 |
| JP | 2009-055690 A | 3/2009 |
| JP | 2013-146149 A | 7/2013 |
| WO | 2011-016134 A1 | 2/2011 |
| WO | 2013/098904 A1 | 7/2013 |

* cited by examiner

*Primary Examiner* — Jeffrey Zweizig
(74) *Attorney, Agent, or Firm* — Oliff PLC

(57) ABSTRACT

An electric vehicle disclosed in the specification includes a main battery, a main electric power supply wire connected with the main battery, an electric power control unit including a smoothing capacitor that smooths a voltage of the main electric power supply wire, a switch that switches the main electric power supply wire between conduction and non-conduction, a sub battery having a lower voltage than the main battery, a sub electric power supply wire connected with the sub battery, a first DC-DC converter that can perform a boost operation from the sub electric power supply wire to the main electric power supply wire on the electric power control unit side relative to the switch, and a second DC-DC converter that can perform a buck operation from the main electric power supply wire on the main battery side to the sub electric power supply wire.

6 Claims, 8 Drawing Sheets

ELECTRIC VEHICLE

INCORPORATION BY REFERENCE

The disclosure of Japanese Patent Application No. 2014-238705 filed on Nov. 26, 2014 including the specification, drawings and abstract is incorporated herein by reference in its entirety.

BACKGROUND OF THE INVENTION

1. Field of the Invention

The technology disclosed in the specification relates to an electric vehicle having a motor for running. The "electric vehicle" in the specification includes both an electric vehicle having only a motor for running without having an engine and a hybrid vehicle having the motor for running as well as the engine.

2. Description of Related Art

Japanese Patent Application Publication No. 2007-318849 discloses an electric vehicle including a main battery, a main electric power supply wire connected with the main battery, an electric power control unit including a smoothing capacitor that a smooths the voltage of the main electric power supply wire, a switch that is between the main battery and the electric power control unit and that switches the main electric power supply wire between conduction and non-conduction, a sub battery having a lower voltage than the main battery, a sub electric power supply wire connected with the sub battery, and a DC-DC converter that connects the main electric power supply wire on the electric power control unit side relative to the switch and the sub electric power supply wire and that can perform an boost operation to boost the electric power from the sub electric power supply wire and to supply the electric power to the main electric power supply wire.

In the above electric vehicle, when the switch is switched from the non-conduction to the conduction, a high inrush current flows through the main electric power supply wire shortly after the switch is switched to the conduction, if the voltage of the main battery is different from the voltage of the smoothing capacitor of the electric power control unit. Hence, before the switch is switched from the non-conduction to the conduction, it is necessary to perform the pre-charge of the smoothing capacitor such that the voltage of the main battery coincides with the voltage of the smoothing capacitor. In the electric vehicle in JP 2007-318849 A, the DC-DC converter performs the boost operation before the switch is switched from the non-conduction to the conduction. Thereby, it is possible to perform the pre-charge of the smoothing capacitor by supplying the electric power from the sub battery. On this occasion, in the DC-DC converter, an internal inductor and transformer suppress a sudden change in output current, and therefore, a high inrush current does not flow through the smoothing capacitor.

SUMMARY OF THE INVENTION

In the case of performing the pre-charge of the smoothing capacitor by supplying the electric power from the sub battery, since the sub battery cannot supply a high electric power, the pre-charge requires a long time. The specification provides a technique that makes it possible to shorten the time required for the pre-charge of the smoothing capacitor.

An electric vehicle according to an aspect of the invention includes: a main battery; a main electric power supply wire connected with the main battery; an electric power control unit including a smoothing capacitor that smooths a voltage of the main electric power supply wire; a switch provided between the main battery and the electric power control unit, the switch being configured to switch the main electric power supply wire between conduction and non-conduction; a sub battery having a lower voltage than the main battery; a sub electric power supply wire connected with the sub battery; a first DC-DC converter connecting the main electric power supply wire and the sub electric power supply wire, the main electric power supply wire connecting the switch and the electric power control unit, the first DC-DC converter being configured to boost electric power from the sub electric power supply wire and to supply the electric power to the main electric power supply wire; and a second DC-DC converter connecting the main electric power supply wire and the sub electric power supply wire, the main electric power supply wire connecting the switch and the main battery, the second DC-DC converter being configured to buck electric power from the main electric power supply wire and to supply the electric power to the sub electric power supply wire.

In the above electric vehicle, the first DC-DC converter performs the boost operation. Thereby, it is possible to perform the pre-charge of the smoothing capacitor, by supplying the electric power from the sub electric power supply wire to the main electric power supply wire on the electric power control unit side. At this time, in the above electric vehicle, the second DC-DC converter performs the buck operation. Thereby, not only the electric power is supplied from the sub battery to the smoothing capacitor through the first DC-DC converter, but also the electric power is supplied from the main battery to the smoothing capacitor through the second DC-DC converter and the first DC-DC converter. Such a configuration makes it possible to shorten the time required for the pre-charge of the smoothing capacitor, compared to the case of performing the pre-charge by supplying the electric power from only the sub battery. Here, on this occasion, in the first DC-DC converter, an internal inductor and transformer suppress a sudden change in output current, and therefore, a high inrush current does not flow through the smoothing capacitor.

Details and further improvements for the technique disclosed in the specification will be described in detail, in DETAILED DESCRIPTION OF EMBODIMENT.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

In some embodiments, in the electric vehicle, the first DC-DC converter is a bidirectional DC-DC converter further capable of performing a buck operation to buck electric power from the main electric power supply wire and to supply the electric power to the sub electric power supply wire. Such a configuration makes it possible to charge the sub battery by supplying the electric power from the electric power control unit to the sub battery, regardless of the conduction/non-conduction of the switch. Further, such a configuration makes it possible to charge the sub battery using both of the first DC-DC converter and the second DC-DC converter, during the conduction of the switch, allowing for the shortening of the time required for the charge of the sub battery.

In some embodiments, in the electric vehicle, the second DC-DC converter is a unidirectional DC-DC converter capable of performing only the buck operation. Such a configuration makes it possible to reduce the manufacturing cost.

Alternatively, in some embodiments, in the electric vehicle, the second DC-DC converter is a bidirectional DC-DC converter further capable of performing a boost operation to boost electric power from the sub electric power supply wire and to supply the electric power to the main electric power supply wire. Such a configuration makes it possible to charge the main battery by supplying the electric power from the electric power control unit and/or the sub battery to the main battery, regardless of the conduction/non-conduction of the switch.

In some embodiments, the electric vehicle further includes a filter configured to suppress noise generation on the sub electric power supply wire side of the first DC-DC converter and to suppress noise generation on the sub electric power supply wire side of the second DC-DC converter. Such a configuration makes it possible to reduce the manufacturing cost, compared to the case of separately providing a filter for suppressing the noise generation on the sub electric power supply wire side of the first DC-DC converter and a filter for suppressing the noise generation on the sub electric power supply wire side of the second DC-DC converter.

In some embodiments, the electric vehicle further includes a control circuit configured to control an operation of a switching circuit of the first DC-DC converter and to control an operation of a switching circuit of the second DC-DC converter. Such a configuration makes it possible to reduce the manufacturing cost, compared to the case of separately providing a control circuit for controlling the operation of the switching circuit of the first DC-DC converter and a control circuit for controlling the operation of the switching circuit of the second DC-DC converter.

Figure 1:
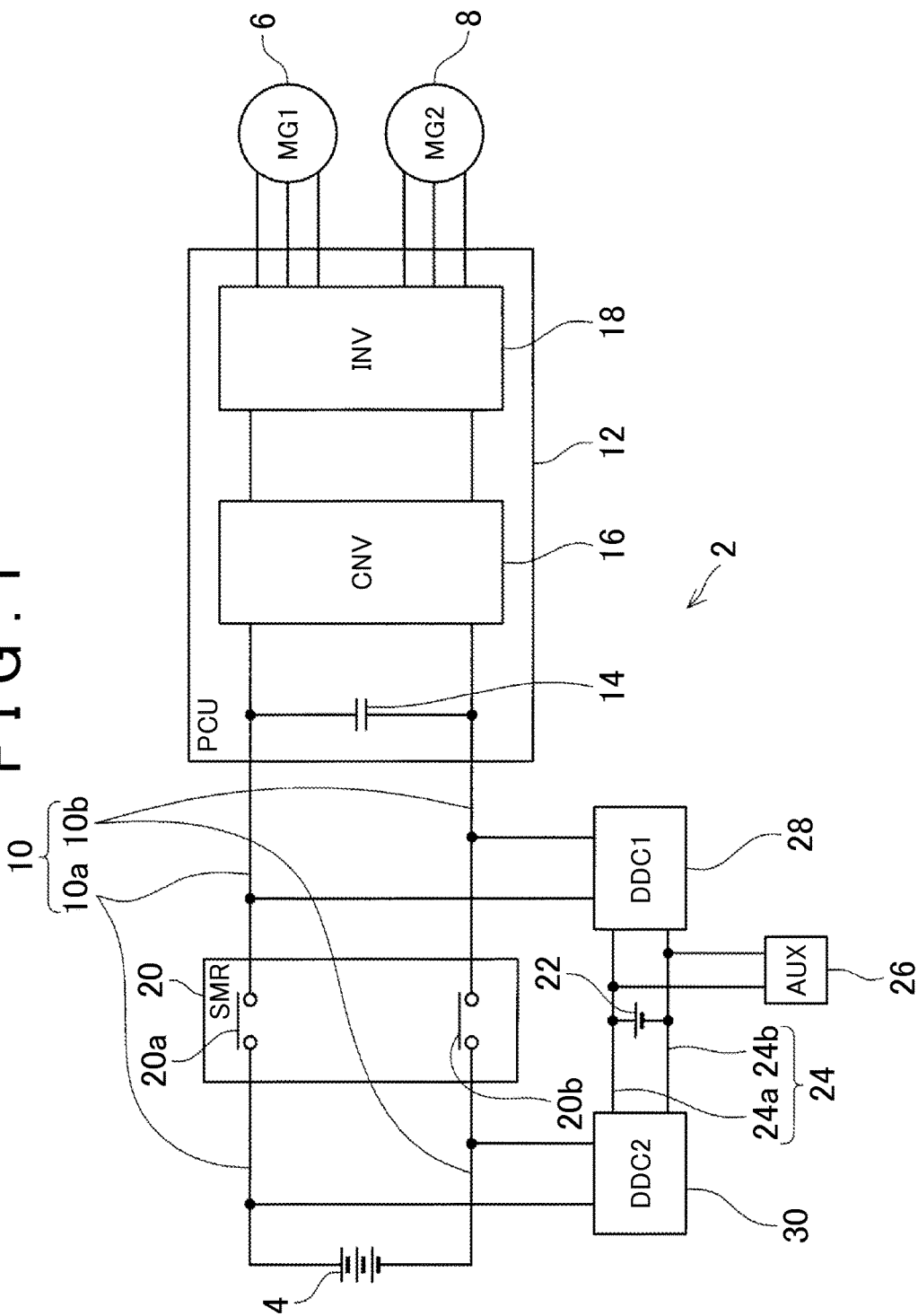
FIG. 1 is a block diagram of an electric system of an electric vehicle according to an embodiment.

FIG. 1 shows a block diagram of an electric system of an electric vehicle 2 according to an embodiment. The electric vehicle 2 according to the embodiment is a hybrid vehicle that can run by utilizing the dynamic power of an engine (not illustrated) and can run by utilizing the electric power of a main battery 4. In the case where the electric vehicle 2 runs by utilizing the dynamic power of the engine, some of the dynamic power generated by the engine is transmitted to drive wheels (not illustrated). Therewith, the rest of the dynamic power of the engine is used for the electric power generation of a first motor 6, and by the electric power generated in the first motor 6, a second motor 8 is driven, so that the drive wheels are rotated. Here, when the engine is started, the electric power from the main battery 4 is supplied to the first motor 6, and the first motor 6 functions as a starter motor. In the case where the electric vehicle 2 runs by utilizing the electric power of the main battery 4, the second motor 8 is driven by the electric power from the main battery 4, so that the driven wheels are rotated.

The main battery 4 is a secondary battery such as a nickel-metal hydride battery or a lithium-ion battery. In the embodiment, the voltage of the main battery 4 is about 300 V. The electric vehicle 2 can generate electric power in the first motor 6, using the dynamic power of the engine, and can charge the main battery 4 by the electric power generated in the first motor 6. Further, when the running electric vehicle 2 decelerates, the electric vehicle 2 can regenerate electric power in the second motor 8, and can charge the main battery 4 by the electric power generated in the second motor 8.

The main battery 4 is connected with an electric power control unit (PCU) 12 through a main electric power supply wire 10. The main electric power supply wire 10 includes a positive electrode wire 10*a* connected with a positive electrode terminal of the main battery 4, and a negative electrode wire 10*b* connected with a negative electrode terminal of the main battery 4.

The PCU 12 is provided between the main battery 4 and the first and second motors 6, 8. The PCU 12 includes a smoothing capacitor 14, a converter 16 and an inverter 18. The smoothing capacitor 14 smooths the voltage of the main electric power supply wire 10. The converter 16, as necessary, boosts the electric power supplied from the main battery 4, to a voltage appropriate for the drive of the first motor 6 or the second motor 8. Further, the converter 16 can buck the voltage of the electric power generated by the first motor 6 or the second motor 8, to a voltage appropriate for the charge of the main battery 4. In the embodiment, the voltage to be used for the drive of the first motor 6 or the second motor 8 is about 600 V. The inverter 18 transforms the direct-current electric power supplied from the main battery 4, into the three-phase alternating-current electric power for driving the first motor 6 or the second motor 8. Further, the inverter 18 can transform the three-phase alternating-current electric power generated by the first motor 6 or the second motor 8, into the direct-current electric power for charging the main battery 4.

Between the main battery 4 and the PCU 12, a system main relay (SMR) 20 is provided. The SMR 20 includes a switch 20*a* that switches the positive electrode wire 10*a* of the main electric power supply wire 10 between conduction and non-conduction, and a switch 20*b* that switches the negative electrode wire 10*b* of the main electric power supply wire 10 between conduction and non-conduction. That is, the SMR 20 switches the main electric power supply wire 10 between conduction and non-conduction.

The electric vehicle 2 includes a sub battery 22 having a lower voltage than the main battery 4. The sub battery 22 is a secondary battery such as a lead-acid battery. In the embodiment, the voltage of the sub battery 22 is about 13 V to 14.5 V. The sub battery 22 is connected with auxiliary machinery 26 such as a power steering and an air-conditioner, through a sub electric power supply wire 24. The sub electric power supply wire 24 includes a positive electrode wire 24a connected with a positive electrode terminal of the sub battery 22, and a negative electrode wire 24b connected with a negative electrode terminal of the sub battery 22. The negative electrode wire 24b of the sub electric power supply wire 24 provides the ground potential.

The main electric power supply wire 10 on the PCU 12 side relative to the SMR 20 and the sub electric power supply wire 24 are connected through a first DC-DC converter 28. The first DC-DC converter 28 can perform a buck operation to buck the electric power from the main electric power supply wire 10 and to supply the electric power to the sub electric power supply wire 24, and can perform a boost operation to boost the electric power from the sub electric power supply wire 24 and to supply the electric power to the main electric power supply wire 10. The first DC-DC converter 28 is a so-called bidirectional DC-DC converter, and is a buck-boost DC-DC converter. In the electric vehicle 2, the buck operation of the first DC-DC converter 28 makes it possible to charge the sub battery 22 by the electric power generated by the first motor 6 or the second motor 8, regardless of the conduction/non-conduction of the SMR 20. Further, in the electric vehicle 2, the boost operation of the first DC-DC converter 28 makes it possible to drive the first motor 6 or the second motor 8 by utilizing the electric power of the sub battery 22, regardless of the conduction/non-conduction of the SMR 20.

The main electric power supply wire 10 on the main battery 4 side relative to the SMR 20 and the sub electric power supply wire 24 are connected through a second DC-DC converter 30. The second DC-DC converter 30 can perform only a buck operation to buck the electric power from the main electric power supply wire 10 and to supply the electric power to the sub electric power supply wire 24. The second DC-DC converter 30 is a so-called unidirectional DC-DC converter, and is a buck DC-DC converter. In the electric vehicle 2, when the SMR 20 conducts, the first DC-DC converter 28 performs the buck operation, and the second DC-DC converter 30 performs the buck operation. Thereby, through both of the first DC-DC converter 28 and the second DC-DC converter 30, it is possible to charge the sub battery 22 by the electric power from the main battery 4 and the electric power generated by the first motor 6 or the second motor 8. In this case, it is possible to increase the current to be supplied to the sub battery 22 and to shorten the time required for the charge of the sub battery 22, compared to the case of charging the sub battery 22 through only either of the first DC-DC converter 28 and the second DC-DC converter 30.

Figure 2:
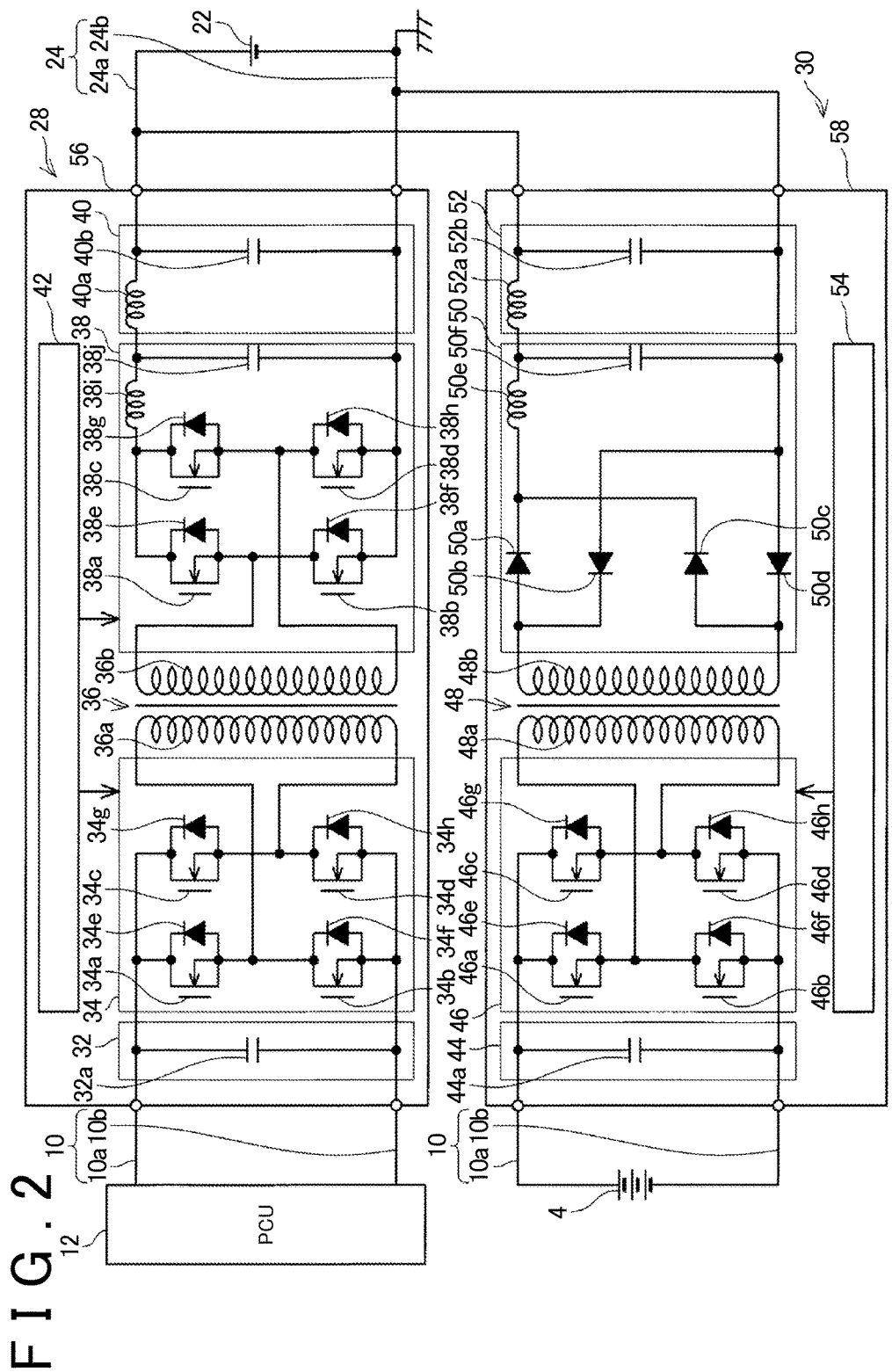
FIG. 2 is a diagram showing a schematic configuration of a first DC-DC converter and a second DC-DC converter according to the embodiment.

FIG. 2 shows a schematic configuration of the first DC-DC converter 28 and the second DC-DC converter 30. In the following description, with respect to the first DC-DC converter 28, the main electric power supply wire 10 side (that is, the PCU 12 side) is referred to as the primary side, and the sub electric power supply wire 24 side (that is, the sub battery 22 side) is referred to as the secondary side. Similarly, with respect to the second DC-DC converter 30, the main electric power supply wire 10 side (that is, the main battery 4 side) is referred to as the primary side, and the sub electric power supply wire 24 side (that is, the sub battery 22 side) is referred to as the secondary side.

The first DC-DC converter 28 includes a primary-side filter 32, a primary-side circuit 34, a transformer 36, a secondary-side circuit 38, a secondary-side filter 40, and a control circuit 42. The first DC-DC converter 28 is an insulated DC-DC converter. The primary-side filter 32, the primary-side circuit 34, the transformer 36, the secondary-side circuit 38, the secondary-side filter 40, and the control circuit 42 are contained in a case 56.

The primary-side filter 32 suppresses the noise generation on the main electric power supply wire 10 side of the first DC-DC converter 28. In the embodiment, the primary-side filter 32 includes a capacitor 32a.

The primary-side circuit 34 includes switching elements 34a, 34b, 34c, 34d, and reflux diodes 34e, 34f, 34g, 34h connected in parallel to the switching elements 34a, 34b, 34c, 34d respectively. The switching element 34a and the switching element 34b are connected in series, and the switching element 34c and the switching element 34d are connected in series. It can be said that the primary-side circuit 34 is a switching circuit.

The transformer 36 includes a primary-side coil 36a and a secondary-side coil 36b. The transformer 36 can buck the electric power from the primary-side coil 36a to supply the electric power to the secondary-side coil 36b, and can boost the electric power from the secondary-side coil 36b to supply the electric power to the primary-side coil 36a. One end of the primary-side coil 36a is connected between the switching element 34a and the switching element 34b, and the other end of the primary-side coil 36a is connected between the switching element 34c and the switching element 34d.

The secondary-side circuit 38 includes switching elements 38a, 38b, 38c, 38d, reflux diodes 38e, 37f, 38g, 38h connected in parallel to the switching elements 38a, 38b, 38c, 38d respectively, an inductor 38i, and capacitor 38j. The switching element 38a and the switching element 38b are connected in series, and the switching element 38c and the switching element 38d are connected in series. One end of the secondary-side coil 36b is connected between the switching element 38a and the switching element 38b, and the other end of the secondary-side coil 36b is connected between the switching element 38c and the switching element 38d. It can be said that the secondary-side circuit 38 is a switching circuit.

The secondary-side filter 40 suppresses the noise generation on the sub electric power supply wire 24 side of the first DC-DC converter 28. In the embodiment, the secondary-side filter 40 includes an inductor 40a and a capacitor 40b.

The control circuit 42 controls the operation of the switching elements 34a, 34b, 34c, 34d of the primary-side circuit 34, and the operation of the switching elements 38a, 38b, 38c, 38d of the secondary-side circuit 38.

The operation of the first DC-DC converter 28 will be described. When the first DC-DC converter 28 performs the buck operation, the primary-side circuit 34 transforms direct-current electric power into alternating-current electric power, and after the buck by the transformer 36, the secondary-side circuit 38 transforms the alternating-current electric power into direct-current electric power. On this occasion, in the secondary-side circuit 38, without the operation of the switching elements 38a, 38b, 38c, 38d, the reflux diodes 38e, 38f, 38g, 38h perform the rectification, and the inductor 38i and the capacitor 38j perform the smoothing. Thereby, it is possible to buck the electric power from the main electric power supply wire 10 and to supply the electric power to the sub electric power supply wire 24. On the other hand, when the first DC-DC converter 28 performs the boost operation, the secondary-side circuit 38 transforms direct-current electric power into alternating-current electric power, and after the boost by the transformer 36, the primary-side circuit 34 transforms the alternating-current electric power into direct-current electric power. On this occasion, in the primary-side circuit 34, without the operation of the switching elements 34a, 34b, 34c, 34d, the reflux diodes 34e, 34f, 34g, 34h perform the rectification, and the primary-side filter 32 performs the smoothing.

Here, the specific circuit configuration of the primary-side filter 32, primary-side circuit 34, secondary-side circuit 38 and secondary-side filter 40 of the first DC-DC converter 28 shown in FIG. 2 is just an example. As the first DC-DC converter 28, any configuration may be used if it can perform the buck operation to buck the electric power from the main electric power supply wire 10 and to supply the electric power to the sub electric power supply wire 24, and can perform the boost operation to boost the electric power from sub electric power supply wire 24 and to supply the electric power to the main electric power supply wire 10.

The second DC-DC converter 30 includes a primary-side filter 44, a primary-side circuit 46, a transformer 48, a secondary-side circuit 50, a secondary-side filter 52, and a control circuit 54. The second DC-DC converter 30 is an insulated DC-DC converter. The primary-side filter 44, the primary-side circuit 46, the transformer 48, the secondary-side circuit 50, the secondary-side filter 52, and the control circuit 54 are contained in a case 58.

The primary-side filter 44 suppresses the noise generation on the main electric power supply wire 10 side of the second DC-DC converter 30. In the embodiment, the primary-side filter 44 includes a capacitor 44a.

The primary-side circuit 46 includes switching elements 46a, 46b, 46c, 46d, and reflux diodes 46e, 46f, 46g, 46h connected in parallel to the switching elements 46a, 46b, 46c, 46d respectively. The switching element 46a and the switching element 46b are connected in series, and the switching element 46c and the switching element 46d are connected in series. It can be said that the primary-side circuit 46 is a switching circuit.

The transformer 48 includes a primary-side coil 48a and a secondary-side coil 48b. The transformer 48 can buck the electric power from the primary-side coil 48a to supply the electric power to the secondary-side coil 48b. One end of the primary-side coil 48a is connected between the switching element 46a and the switching element 46b, and the other end of the primary-side coil 48a is connected between the switching element 46c and the switching element 46d.

The secondary-side circuit 50 includes diodes 50a, 50b, 50c, 50d, an inductor 50e, and a capacitor 50f. The diodes 50a, 50b, 50c, 50d constitute a bridge circuit.

The secondary-side filter 52 suppresses the noise generation on the sub electric power supply wire 24 side of the second DC-DC converter 30. In the embodiment, the secondary-side filter 52 includes an inductor 52a and a capacitor 52b.

The control circuit 54 controls the operation of the switching elements 46a, 46b, 46c, 46d of the primary-side circuit 46.

The operation of the second DC-DC converter 30 will be described. When the second DC-DC converter 30 performs the buck operation, the primary-side circuit 46 transforms direct-current electric power into alternating-current electric power, and after the buck by the transformer 48, the secondary-side circuit 50 transforms the alternating-current electric power into direct-current electric power. On this occasion, in the secondary-side circuit 50, the diodes 50a, 50b, 50c, 50d perform the rectification, and the inductor 50e and the capacitor 50f perform the smoothing. Thereby, it is possible to buck the electric power from the main electric power supply wire 10 and to supply the electric power to the sub electric power supply wire 24.

Here, the second DC-DC converter 30 is not limited to the configuration shown in FIG. 2, in which the primary-side circuit 46 includes the switching elements 46a, 46b, 46c, 46d and the control circuit 54 controls the operation of the primary-side circuit 46. It is allowable to adopt a configuration in which the secondary-side circuit 50 includes switching elements and the control circuit 54 controls the operation of the secondary-side circuit 50, or a configuration in which both the primary-side circuit 46 and the secondary-side circuit 50 include switching elements and the control circuit 54 controls the operation of both the primary-side circuit 46 and the secondary-side circuit 50. The specific circuit configuration of the primary-side filter 44, primary-side circuit 46, secondary-side circuit 50 and secondary-side filter 52 of the second DC-DC converter 30 shown in FIG. 2 is just an example. As the second DC-DC converter 30, any configuration may be used if it can perform the buck operation to buck the electric power from the main electric power supply wire 10 and to supply the electric power to the sub electric power supply wire 24.

In the electric vehicle 2 shown in FIG. 1, when the SMR 20 is switched from the non-conduction to the conduction, a high inrush current flows through the main electric power supply wire 10 shortly after the SMR 20 is switched to the conduction, if the voltage of the main battery 4 is different from the voltage of the smoothing capacitor 14 of the PCU 12. Hence, before the SMR 20 is switched from the non-conduction to the conduction, the electric vehicle 2 performs the pre-charge of the smoothing capacitor 14 such that the voltage of the main battery 4 coincides with the voltage of the smoothing capacitor 14.

Figure 3:
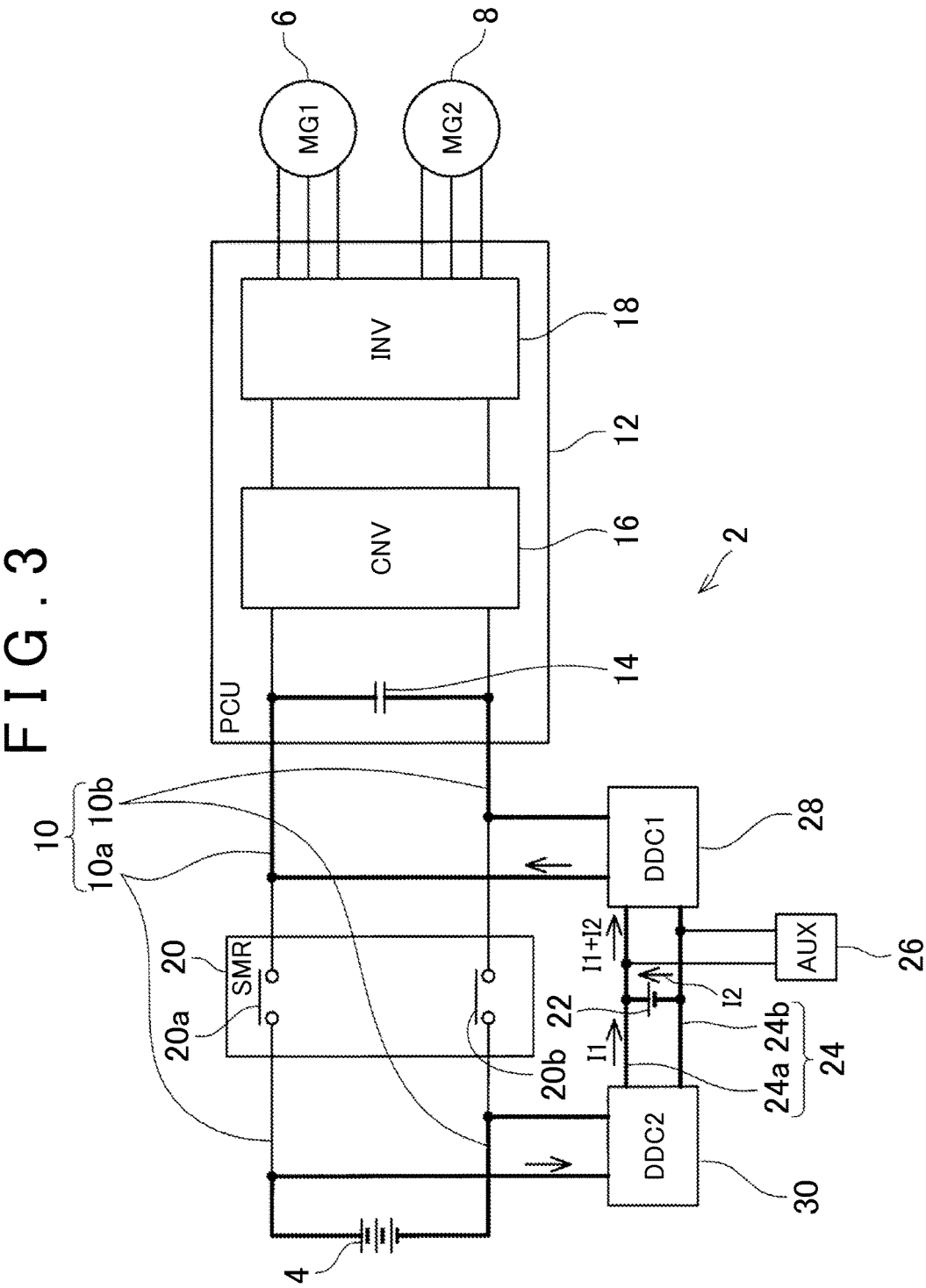
FIG. 3 is a diagram showing a manner of the pre-charge of a smoothing capacitor in the electric vehicle according to the embodiment.

As shown in FIG. 3, in the electric vehicle 2 according to the embodiment, at the time of the pre-charge of the smoothing capacitor 14, the first DC-DC converter 28 performs the boost operation, and the second DC-DC converter 30 performs the buck operation. On this occasion, a current $I_1$ to be supplied from the main battery 4 through the second DC-DC converter 30 is input to the sub electric power supply wire 24 side of the first DC-DC converter 28, in addition to a current $I_2$ to be supplied from the sub battery 22. Therefore, to the smoothing capacitor 14, the sub battery 22 supplies the electric power through the first DC-DC converter 28, and in addition, the main battery 4 also supplies the electric power through the second DC-DC converter 30 and the first DC-DC converter 28. Such a configuration makes it possible to shorten the time required for the pre-charge of the smoothing capacitor 14, compared to the case of performing the pre-charge by supplying the electric power from only the sub battery 22.

Figure 4:
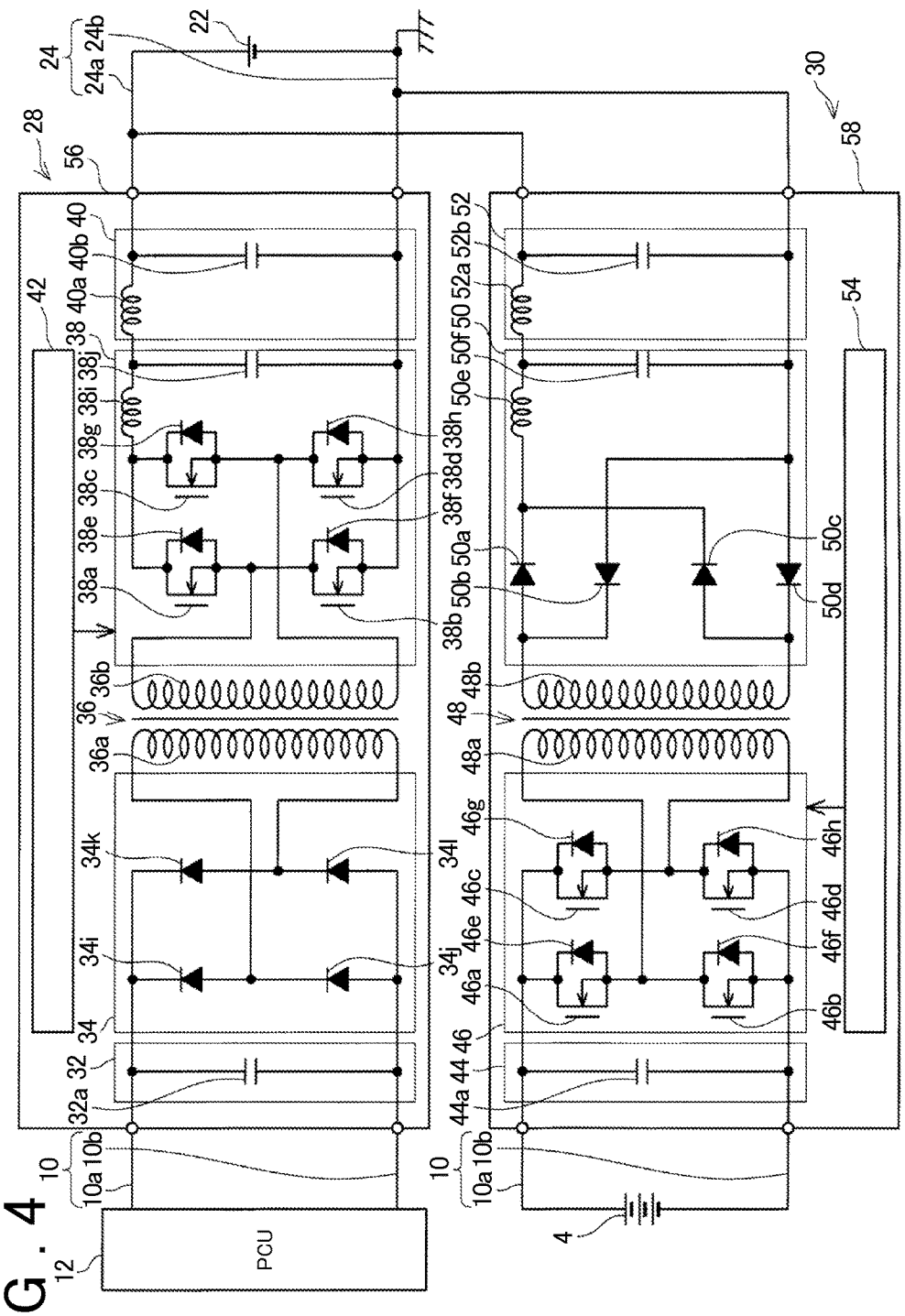
FIG. 4 is a diagram showing a schematic configuration of a modification of the first DC-DC converter and the second DC-DC converter according to the embodiment.

Here, for shortening the time required for the pre-charge of the smoothing capacitor 14, it is only necessary that the first DC-DC converter 28 can perform the boost operation and the second DC-DC converter 30 can perform the buck operation. Therefore, for example, as shown in FIG. 4, the first DC-DC converter 28 may be a unidirectional boost DC-DC converter that can perform only the boost operation to boost the electric power from the sub electric power supply wire 24 and to supply the electric power to the main electric power supply wire 10. In the example shown in FIG. 4, the primary-side circuit 34 of the first DC-DC converter 28 includes diodes 34*i*, 34*j*, 34*k*, 34*l*. The diodes 34*i*, 34*j*, 34*k*, 34*l* constitute a bridge circuit. In this case, it is possible to reduce the manufacturing cost, compared to the case where the first DC-DC converter 28 is a bidirectional buck-boost DC-DC converter.

Figure 5:
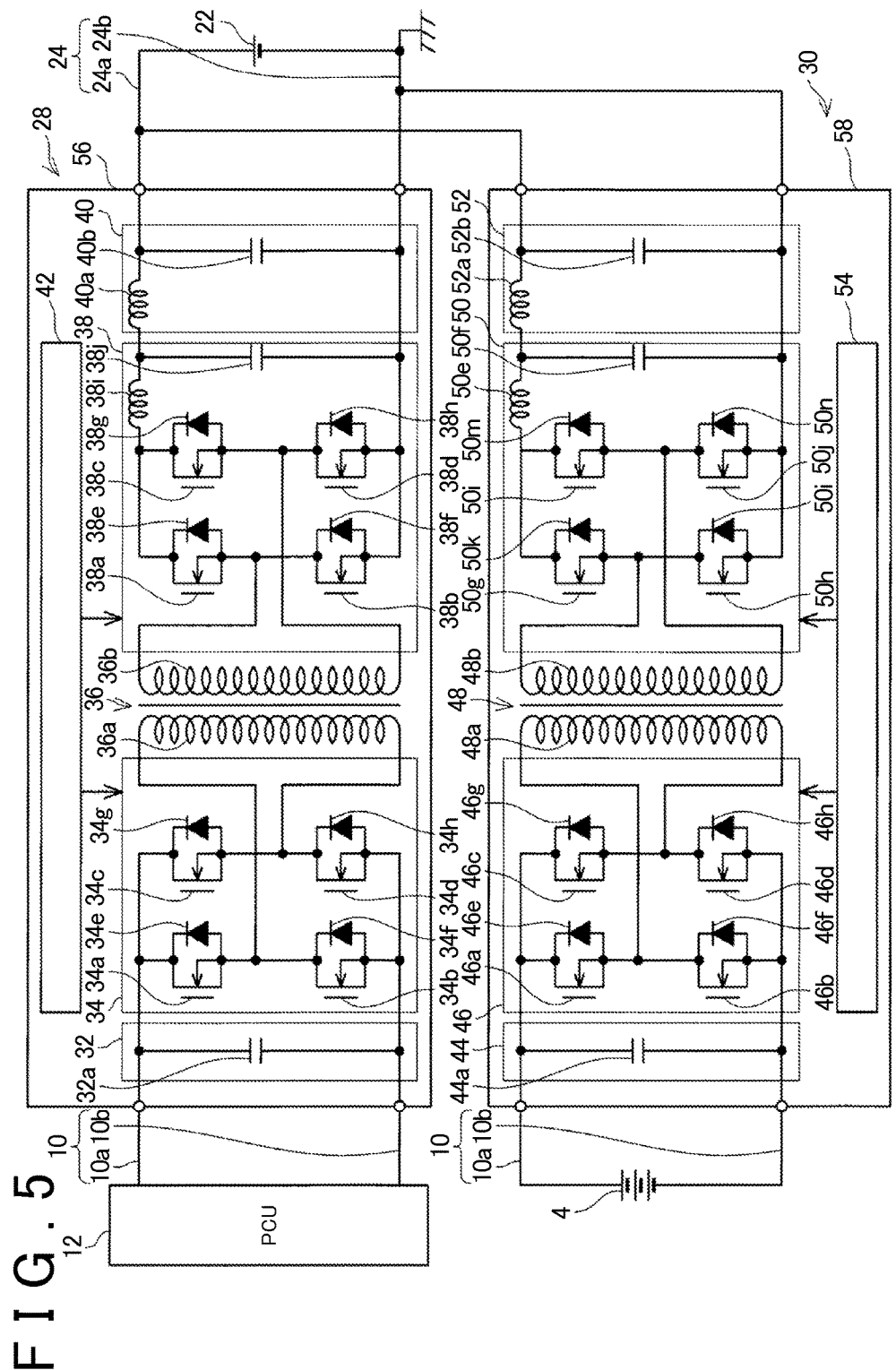
FIG. 5 is a diagram showing a schematic configuration of an alternative modification of the first DC-DC converter and the second DC-DC converter according to the embodiment.

Alternatively, as shown in FIG. 5, the second DC-DC converter 30 may be a bidirectional buck-boost DC-DC converter that can perform the buck operation to buck the electric power from the main electric power supply wire 10 and to supply the electric power to the sub electric power supply wire 24 and the boost operation to boost the electric power from the sub electric power supply wire 24 and to supply the electric power to the main electric power supply wire 10. In the example shown in FIG. 5, the secondary-side circuit 50 of the second DC-DC converter 30 includes switching elements 50*g*, 50*h*, 50*i*, 50*j*, reflux diodes 50*k*, 50*l*, 50*m*, 50*n* connected in parallel to the switching elements 50*g*, 50*h*, 50*i*, 50*j* respectively, an inductor 50*e*, and a capacitor 50*f*. The switching element 50*g* and the switching element 50*h* are connected in series, and the switching element 50*i* and the switching element 50*j* are connected in series. One end of the secondary-side coil 48*b* of the transformer 48 is connected between the switching element 50*g* and the switching element 50*h*, and the other end of the secondary-side coil 48*b* is connected between the switching element 50*i* and the switching element 50*j*. It can be said that the secondary-side circuit 50 is a switching circuit. In this case, the second DC-DC converter 30 performs the boost operation. Thereby, it is possible to charge the main battery 4 by utilizing the electric power of the sub battery 22, regardless of the conduction/non-conduction of the SMR 20. Further, the first DC-DC converter 28 performs the buck operation, and the second DC-DC converter 30 performs the boost operation. Thereby, it is possible to charge the main battery 4 by the electric power generated by the first motor 6 or the second motor 8, regardless of the conduction/non-conduction of the SMR 20.

Here, the first DC-DC converter 28 and the second DC-DC converter 30 can be mounted in the electric vehicle 2, in various manners. For example, as shown in FIG. 2, the first DC-DC converter 28 and the second DC-DC converter 30 may be mounted in the electric vehicle 2 while being contained in the separate cases 56, 58. In this case, it is possible to downsize each of the cases 56, 58, and therefore, to increase the flexibility of the mounting in the electric vehicle 2, compared to the case where the first DC-DC converter 28 and the second DC-DC converter 30 are contained in a single case.

Figure 6:
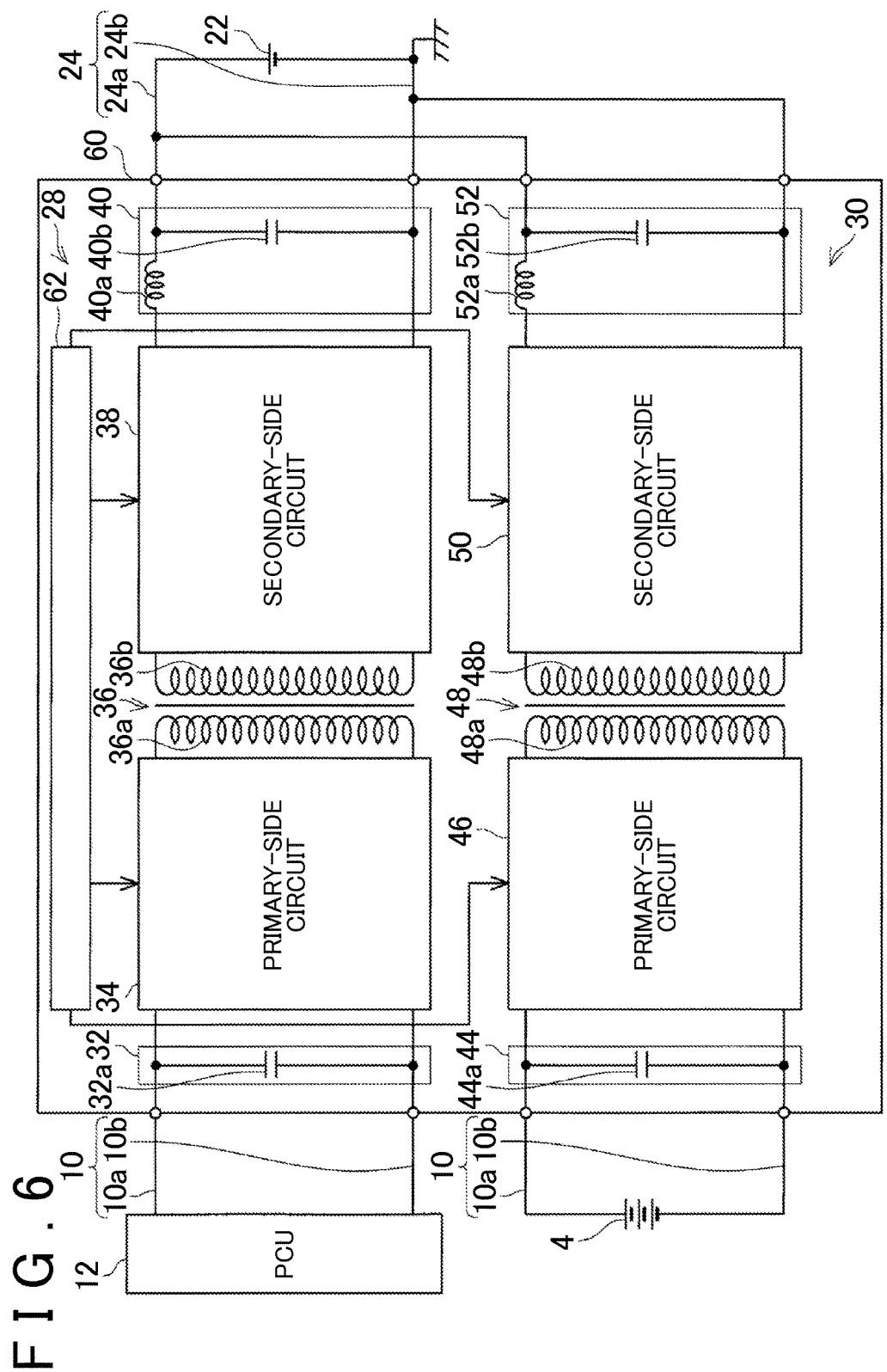
FIG. 6 is a diagram showing a schematic configuration of a further alternative modification of the first DC-DC converter and the second DC-DC converter according to the embodiment.
Figure 7:
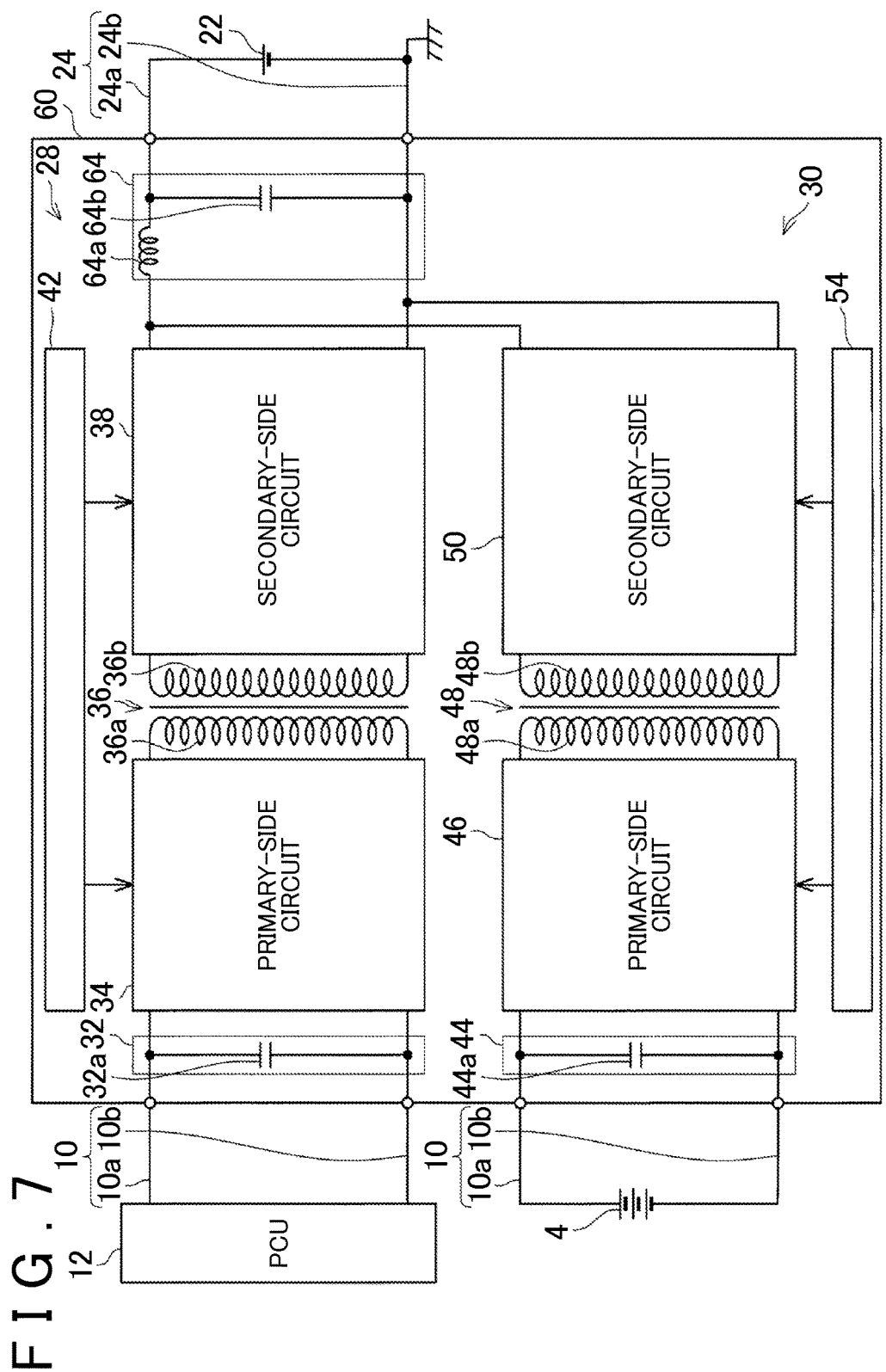
FIG. 7 is a diagram showing a schematic configuration of a further alternative modification of the first DC-DC converter and the second DC-DC converter according to the embodiment.
Figure 8:
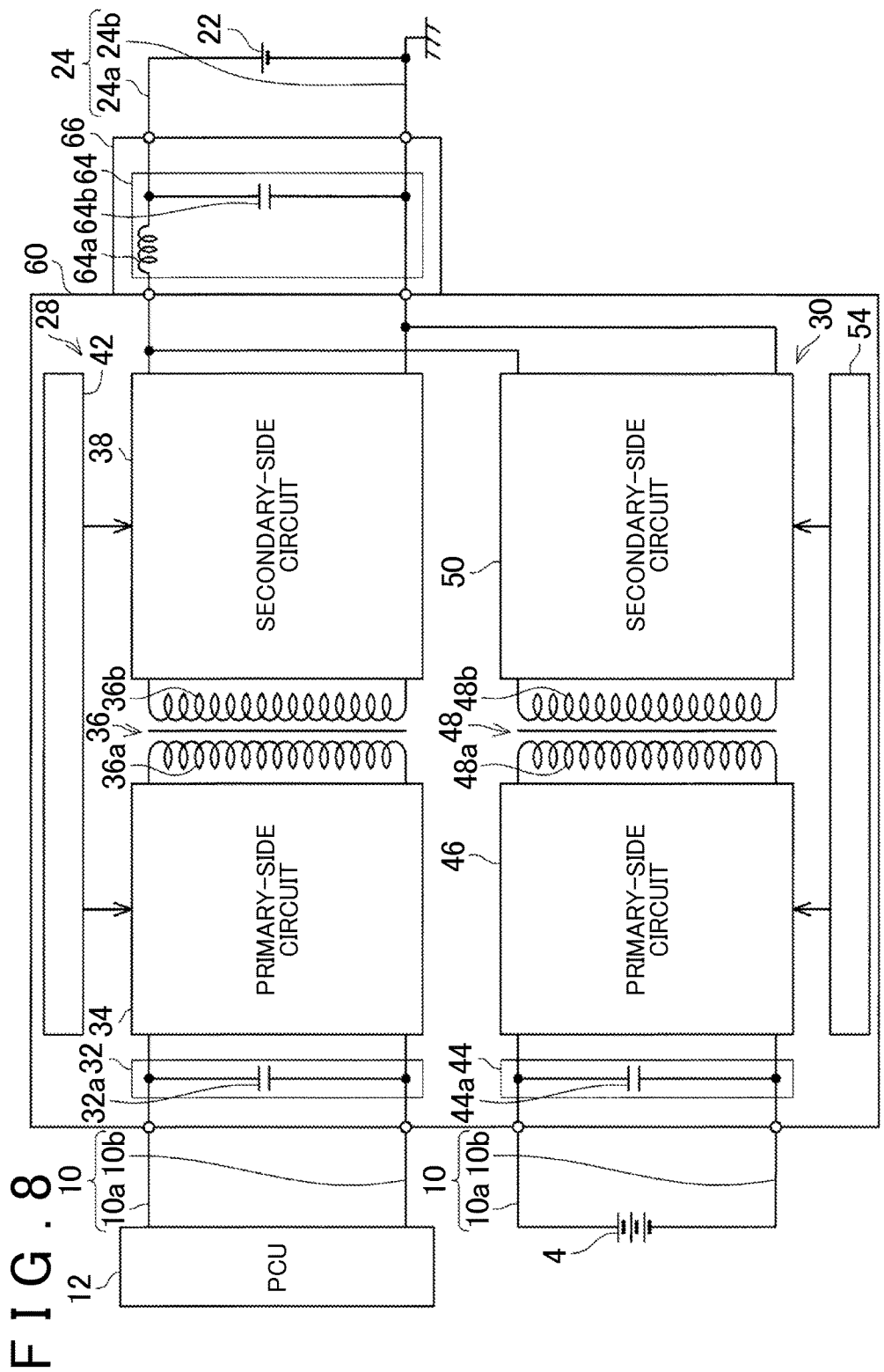
FIG. 8 is a diagram showing a schematic configuration of a further alternative modification of the first DC-DC converter and the second DC-DC converter according to the embodiment.

Alternatively, as shown in FIG. 6 to FIG. 8, the first DC-DC converter 28 and the second DC-DC converter 30 may be mounted while being contained in a single case. In this case, it is possible to share various constituent elements and to reduce the manufacturing cost, unlike the case where the first DC-DC converter 28 and the second DC-DC converter 30 are contained in separate cases.

For example, as shown in FIG. 6, the first DC-DC converter 28 and the second DC-DC converter 30 may be contained in a single case 60, and the control circuit 42 of the first DC-DC converter 28 and the control circuit 54 of the second DC-DC converter 30 may be implemented as a shared control circuit 62. In this case, the single control circuit 62 controls the operation of the primary-side circuit 34 and/or the secondary-side circuit 38, which are the switching circuits of the first DC-DC converter 28, and the operation of the primary-side circuit 46 and/or the secondary-side circuit 50, which are the switching circuits of the second DC-DC converter 30.

Alternatively, as shown in FIG. 7, the first DC-DC converter 28 and the second DC-DC converter 30 may be contained in the single case 60, and the secondary-side filter 40 of the first DC-DC converter 28 and the secondary-side filter 52 of the second DC-DC converter 30 may be implemented as a shared secondary-side filter 64 In the example shown in FIG. 7, the secondary-side filter 64 includes an inductor 64*a* and a capacitor 64*b*. The secondary-side filter 64 suppresses the noise generation on the sub electric power supply wire 24 side of the first DC-DC converter 28, and suppresses the noise generation on the sub electric power supply wire 24 side of the second DC-DC converter 30. In this case, for example, as shown in FIG. 8, the shared secondary-side filter 64 may be disposed in the exterior of the case 60, instead of in the interior of the case 60. In the example shown in FIG. 8, the shared secondary-side filter 64 is contained in a connector 66 that connects the case 60 and the sub electric power supply wire 24. Ordinarily, the secondary-side filter 64 is provided for suppressing the generation of radio noise in the sub electric power supply wire 24, and it is necessary to perform the tuning differently for each vehicle type of the electric vehicle 2. According to the configuration shown in FIG. 8, it is only necessary to perform the tuning of the secondary-side filter 64 in the connector 66, corresponding to the vehicle type of the electric vehicle 2, and it is unnecessary to alter the constituent elements in the case 60.

Here, similarly to the example shown in FIG. 6, the examples shown in FIG. 7 and FIG. 8 may be configured such that the control circuit 42 of the first DC-DC converter 28 and the control circuit 54 of the second DC-DC converter 30 is implemented as the shared control circuit 62 and the single control circuit 62 controls the operation of the primary-side circuit 34 and/or the secondary-side circuit 38, which are the switching circuits of the first DC-DC converter 28, and the operation of the primary-side circuit 46 and/or the secondary-side circuit 50, which are the switching circuits of the second DC-DC converter 30.

As described above, the electric vehicle 2 according to the embodiment includes the main battery 4, the main electric power supply wire 10 connected with the main battery 4, the PCU 12 including the smoothing capacitor 14 that smooths the voltage of the main electric power supply wire 10, the SMR 20 (which corresponds to the switch) that is between the main battery 4 and the PCU 12 and that switches the main electric power supply wire 10 between the conduction and the non-conduction, the sub battery 22 having a lower voltage than the main battery 4, the sub electric power supply wire 24 connected with the sub battery 22, the first DC-DC converter 28 that connects the main electric power supply wire 10 on the PCU 12 side relative to the SMR 20 and the sub electric power supply wire 24 and that can perform the boost operation to boost the electric power from the sub electric power supply wire 24 and to supply the electric power to the main electric power supply wire 10, and the second DC-DC converter 30 that connects the main electric power supply wire 10 on the main battery 4 side relative to the SMR 20 and the sub electric power supply wire 24 and that can perform the buck operation to buck the electric power from the main electric power supply wire 10 and to supply the electric power to the sub electric power supply wire 24.

Thus, the specific examples of the invention have been described in detail. They are just examples, and do not limit the scope of the claims. The technique described in the claims includes various modifications and alterations of the above-described specific examples. The technical elements described in the specification and the drawings exert the technical utility independently or by various combinations, without being limited to the combinations described in the claims at the time of application. Further, the technique exemplified in the specification or the drawings can achieve a plurality of objects simultaneously, and has the technical utility just by the achievement of one object of them.

What is claimed is:

1. An electric vehicle comprising:
   a main battery;
   a main electric power supply wire connected with the main battery, the main electric power supply wire including a first main electric power supply wire and a second main electric power supply wire;
   an electric power control unit including a smoothing capacitor that smooths a voltage of the main electric power supply wire;
   a switch provided between the main battery and the electric power control unit, the switch being configured to switch the main electric power supply wire between conduction and non-conduction;
   a sub battery having a lower voltage than the main battery;
   a sub electric power supply wire connected with the sub battery;
   a first DC-DC converter connecting the first main electric power supply wire and the sub electric power supply wire, the first main electric power supply wire connecting the switch and the electric power control unit, the first DC-DC converter being configured to boost electric power from the sub electric power supply wire and to supply the electric power to the main electric power supply wire; and
   a second DC-DC converter connecting the second main electric power supply wire and the sub electric power supply wire, the second main electric power supply wire connecting the switch and the main battery, the second DC-DC converter being configured to buck electric power from the main electric power supply wire and to supply the electric power to the sub electric power supply wire.

2. The electric vehicle according to claim 1,
   wherein the first DC-DC converter is a bidirectional DC-DC converter further capable of performing a buck operation to buck electric power from the first main electric power supply wire and to supply the electric power to the sub electric power supply wire.

3. The electric vehicle according to claim 2,
   wherein the second DC-DC converter is a unidirectional DC-DC converter capable of performing only the buck operation.

4. The electric vehicle according claim 2,
   wherein the second DC-DC converter is a bidirectional DC-DC converter further capable of performing a boost operation to boost electric power from the sub electric power supply wire and to supply the electric power to the second main electric power supply wire.

5. The electric vehicle according to claim 1, further comprising a filter configured to:
   i) suppress noise generation on the sub electric power supply wire side of the first DC-DC converter; and
   ii) suppress noise generation on the sub electric power supply wire side of the second DC-DC converter.

6. The electric vehicle according to claim 1, further comprising a control circuit configured to:
   i) control an operation of a switching circuit of the first DC-DC converter; and
   ii) control an operation of a switching circuit of the second DC-DC converter.

* * * * *